(12) United States Patent
Fuchu et al.

(10) Patent No.: US 7,297,275 B2
(45) Date of Patent: Nov. 20, 2007

(54) BIOMEMBRANE FILTRATION APPARATUS AND METHOD

(75) Inventors: Yuichi Fuchu, Tokyo (JP); Atsushi Kobayashi, Kanagawa (JP)

(73) Assignee: Ebara Corporation, Tokyo (JP)

( * ) Notice: Subject to any disclaimer, the term of this patent is extended or adjusted under 35 U.S.C. 154(b) by 315 days.

(21) Appl. No.: 10/483,258

(22) PCT Filed: Nov. 27, 2002

(86) PCT No.: PCT/JP02/12366

§ 371 (c)(1),
(2), (4) Date: Jul. 20, 2004

(87) PCT Pub. No.: WO03/045853

PCT Pub. Date: Jun. 5, 2003

(65) Prior Publication Data

US 2006/0201878 A1    Sep. 14, 2006

(30) Foreign Application Priority Data

Nov. 28, 2001  (JP) .............................. 2001-362649

(51) Int. Cl.
*C02F 3/06* (2006.01)
(52) U.S. Cl. ...................... 210/604; 210/617; 210/150; 210/903
(58) Field of Classification Search ................ 210/603, 210/615, 617, 903, 150, 151, 604
See application file for complete search history.

(56) References Cited

U.S. PATENT DOCUMENTS

| | | | |
|---|---|---|---|
| 2,308,866 A | * | 1/1943 | Dekema ...................... 210/617 |
| 2,992,986 A | * | 7/1961 | Ingram ....................... 210/150 |
| 4,351,729 A | | 9/1982 | Witt |
| 4,469,599 A | * | 9/1984 | Gros et al. ................... 210/150 |
| 4,482,458 A | * | 11/1984 | Rovel et al. ................. 210/617 |
| 4,486,310 A | * | 12/1984 | Thornton ..................... 210/617 |
| 4,696,747 A | * | 9/1987 | Verstraete et al. ........... 210/617 |
| 4,806,148 A | * | 2/1989 | Ottengraf .................... 210/151 |
| 6,100,081 A | * | 8/2000 | Buelna ........................ 210/151 |

FOREIGN PATENT DOCUMENTS

DE           28 24 446           12/1979

(Continued)

*Primary Examiner*—Christopher Upton
(74) *Attorney, Agent, or Firm*—Oblon, Spivak, McClelland, Maier & Neustadt, P.C.

(57) ABSTRACT

The present invention has an object to provide a biomembrane filtration apparatus which can treat a nitrate nitrogen and nitrite nitrogen in an anaerobic state to stably remove them together with SS with efficiency and, simultaneously, can biologically remove the residual hydrogen donor as well remaining in the water to be treated in one and the same biomembrane filtration apparatus by a fixed bed biomembrane filtration method and a method therefore. As the means to achieve such an object, one embodiment of the present invention provides a biomembrane filtration apparatus having a packed layer packed with a particulate packing material to which microorganisms are to attach; an inlet for a liquid to be treated arranged above the packed layer to feed the liquid to be treated; and a gas feed opening arranged under the packed layer to feed a substantially oxygen-free gas or a gas containing trace amounts of oxygen.

14 Claims, 3 Drawing Sheets

FOREIGN PATENT DOCUMENTS

| | | |
|---|---|---|
| JP | 63-158193 | 7/1988 |
| JP | 5-50094 | 3/1993 |
| JP | 6-23390 | 2/1994 |
| JP | 7-222993 | 8/1995 |
| JP | 11-128958 | 5/1999 |

* cited by examiner

BIOMEMBRANE FILTRATION APPARATUS AND METHOD

TECHNICAL FIELD

The present invention relates to a so-called biomembrane filtration apparatus and a method therefore, and more specifically it relates to an apparatus and a method for carrying out a biomembrane filtration treatment of water to be treated (raw water) containing a nitrate nitrogen and a nitrite nitrogen such as sewage, waste water, polluted river water, lake and marshland water and underground water by allowing the water to be treated to pass through a microorganism-attached packed layer.

BACKGROUND ART

The method for purifying water with the use of a microorganism-attached packing material obtained by allowing microorganisms to attach on to the surface of a particulate packing material such as sand, anthracite, active carbon and a plastic filter medium to form a biomembrane is a so-called "biomembrane filtration method", and various types of methods have been quite lately investigated. Among them, a method comprising sprinkling water to be treated over a packed layer in which microorganisms are attached on to a particulate packing material in a fixed bed state from above, and simultaneously flowing air or oxygen from the bottom of the packed layer to form a gas-liquid counter current state, thereby bringing the water to be treated into contact with air or oxygen to effect purification of the water to be treated, and intermittently washing the packed layer and discharging a slurry built up in the packed layer, has many advantages such that a slurry can be treated without circulation; bulking is not caused; clogging of the packed layer by the slurry is prevented; a settling and separation zone is unnecessary since the method also has a physical filtration action; the efficiency of using oxygen is high; and the like, and is popularized.

However, although the biomembrane filtration method as described above is very efficient as to the removal of BOD (biological oxygen demand) and SS (suspended solids) and the nitrification of ammonia, the denitrification which is an anaerobic reaction could not be effectively conducted by this method. For example, in the above described fix bed biomembrane filtration method, it is possible to remove a nitrate nitrogen and a nitrite nitrogen in the water to be treated by stopping the flow of air or oxygen into the packed layer to render the inside of the packed layer anaerobic. However, in this case, a nitrogen gas formed is built up within the packed layer, which prevents formation of a uniform downward flow of the water to be treated, and thus there is a problem of the difficulty of obtaining stabilized removal performance. In addition, in order to remove the nitrate nitrogen and nitrite nitrogen, it is necessary to add a hydrogen donor (for example, an organic substance such as methanol) necessary for the nitrogen removal reaction to the packed layer, and this hydrogen donor sometimes remains in the water to be treated. Accordingly, in order to remove the hydrogen donor such as methanol from the water to be treated, a reaeration tank is typically provided. However, to provide the reaeration tank unfavorably means to add a step and it is clearly preferred to remove the residual hydrogen donor within the biomembrane filtration apparatus.

DISCLOSURE OF THE INVENTION

The present invention has an object to solve the above described problems of the conventional technique and to provide a biomembrane filtration apparatus and a method therefore which can treat the nitrate nitrogen and nitrite nitrogen in an anaerobic state to efficiently and stably remove them together with SS and, simultaneously, can biologically remove the residual hydrogen donor in the water to be treated in one and the same biomembrane filtration apparatus.

As the means to achieve the above described object, the present invention is constituted by various embodiments below.

1. A biomembrane filtration apparatus having a packed layer packed with a particulate packing material to which microorganisms are to attach; an inlet for a liquid to be treated arranged above the packed layer to feed the liquid to be treated; and a gas feed opening arranged under the packed layer to feed a substantially oxygen-free gas or a gas containing trace amounts of oxygen.
2. The biomembrane filtration apparatus according to the above described Item 1, wherein discharge gas receptive piping for receiving the gas to be discharged from the packed layer is provided and the discharge gas receptive piping is connected with the above described gas feed opening.
3. A method of biomembrane filtration of a liquid to be treated through a biomembrane comprising allowing a liquid to be treated to pass through a microorganism-attached packed layer packed with a packing material in which microorganisms are attached on to the surface of a particulate packing material as a downward flow while allowing a substantially oxygen-free gas or a gas containing trace amounts of oxygen to pass through the packed layer from the bottom of the packed layer as an upward flow.
4. The method of biomembrane filtration of a liquid to be treated according to the above described Item 3, wherein the gas discharged from the packed layer is recycled as the gas to be fed from the bottom of the packed layer.
5. The method of biomembrane filtration of a liquid to be treated according to the above described Item 3 or Item 4, wherein the gas containing trace amounts of oxygen contains 0.1 to 4% by volume of oxygen.
6. The method of biomembrane filtration of a liquid to be treated according to the above described any one of Items 3 to 5, wherein the gas is allowed to pass through the packed layer at a superficial velocity of 0.02 $m^3/m^2 \cdot min$ (NTP) to 0.1 $m^3/m^2 \cdot min$ (NTP).

DETAILED EXPLANATION OF THE INVENTION

A preferred concrete mode of the present invention will now be explained by reference to the drawings. The explanation below relates to one preferred mode of the present invention and the present invention is not limited to the following description.

Figure 1:
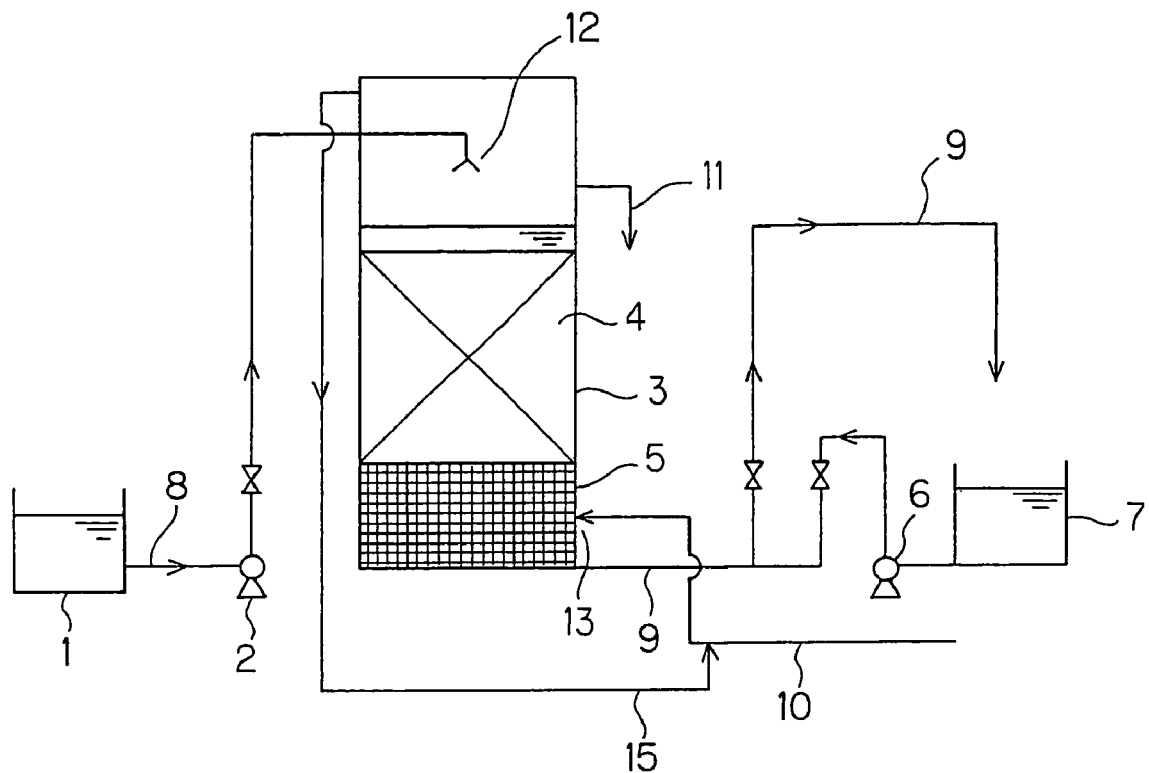
FIG. 1 is a flow block diagram of a biomembrane filtration apparatus relating to one embodiment of the present invention.

FIG. 1 is a flow block diagram of a biomembrane filtration apparatus relating to one embodiment of the present invention. In FIG. 1, 1 is a tank for a liquid to be treated (raw water); 2 is a raw water feed pump; 3 is a biomembrane filtration apparatus; 4 is a packed layer; 5 is a support part; 6 is a pump for washing the packed layer; 7 is a tank for treated water; 8 is feed piping for the liquid to be treated (raw water); 9 is piping for the treated water; 10 is a gas feed piping; 11 is a discharge pipe for washed waste water; 12 is an inlet (nozzle for sprinkling water) for the liquid to be treated (raw water); 13 is a gas feed opening; and 15 is gas circulation piping.

In the biomembrane filtration apparatus as shown in FIG. 1, the liquid to be treated (raw water) is led from the raw water tank 1 to the raw water feed inlet 12 (a nozzle for sprinkling water in the case of FIG. 1) arranged above the packed layer 4 in the biomembrane filtration apparatus by the raw water feed pump 2 through the raw water feed piping 8, and sprinkled on the packed layer therefrom. Within the filtration apparatus, the packed layer 4 packed with a particulate packed material to which microorganisms are attached is arranged so as to be dipped in the sprinkled raw water, and the raw water is passed through the packed layer 4, and treated by undergoing the biological purification action of the microorganisms attaching to the surface of the packing material packed in the packed layer, and then is sent to the treated water tank 7 as the treated water through the treated water piping 9. The gas feed opening 13 is arranged below the packed layer 4 and a substantially oxygen-free gas or a gas containing trace amounts of oxygen is fed from the gas feed piping 10 and is passed through the packed layer as an upward flow. The support part 5 supports the packed layer 4 and, simultaneously provides a space for introducing the gas and functions to receive the treated water having passed through the packed layer and to discharge it. By operating the filtration apparatus in this manner, microorganisms attach on to the surface of the packing material to form a biomembrane and this biomembrane effects the biomembrane filtration treatment of the raw water. According to the present invention, by feeding a substantially oxygen-free gas or a gas containing trace amounts of oxygen to the packed layer, an appropriate gas-liquid counter current state which is the advantage of the biomembrane filtration apparatus can be formed while maintaining the packed layer substantially in an anaerobic atmosphere, and this can well advance the denitrification reaction of a nitrate nitrogen and a nitrite nitrogen.

Further, the treated gas may be recovered from the upper part of the biomembrane filtration apparatus 3 and fed to the gas feed piping 15, by which the gas maybe recycled as the oxygen-free gas or the gas containing trace amounts of oxygen to be introduced into the packed layer.

When the filtration resistance becomes high after continuing the operation of biomembrane filtration, the inflow of the raw water may stop and back wash of the packed layer can be conducted. As the washing water for back wash of the packed material, for example, as shown in FIG. 1, the treated water in the tank 7 for treated water may be fed to the outlet for treated water by the pump 6 for washing the packed layer, and then discharged from the discharge pipe 11 for washed waste water.

Figure 2:
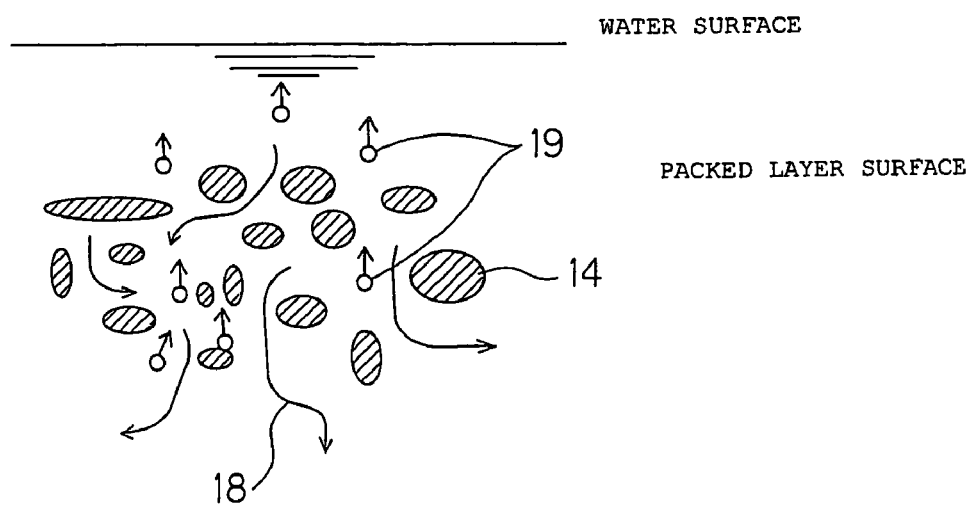
FIG. 2 is a schematic view of a gas-liquid counter current state in a packed layer.

The present invention is characterized by forming a gas-liquid counter current state which is the advantage of the biomembrane filtration apparatus while maintaining the inside of the packed layer anaerobic. The schematic view of the gas-liquid counter current state is shown in FIG. 2. In FIG. 2, 14 is a particulate packing material; 19 is a gas (air bubble) flow; and 18 is a flow of a liquid to be treated. Once an appropriate gas-liquid counter current state is formed in the packed layer, the diffusion of the gas flow 19 and the liquid flow 18 on the surface of the particulate packing material 14 becomes sufficient, and a biomembrane having a uniform thickness can be formed on the surface of the particulate packing material 14. When the biomembrane is ununiform and partially thick or thin, clogging of the packed layer is caused at a thick portion of the biomembrane, and a nitrogen gas formed tends to easily build up and, simultaneously, the liquid to be treated is hard to pass through that part. As a result, an efficient biomembrane filtration treatment ceases to be conducted.

In one embodiment of the present invention, by flowing a substantially oxygen-free gas into the packed layer, an anaerobic state is maintained and, simultaneously, a good gas-liquid counter current state within the packed layer is maintained. The presence of oxygen renders the contact surface of the gas aerobic to reduce the nitrogen removal effect. Although the substantially oxygen-free gas to be flown into the packed layer may be introduced from outside, it is preferred that the gas passed through the packed layer in the biomembrane filtration apparatus can be recovered from the upper part of the apparatus and recycled to easily obtain an appropriate oxygen-free gas.

The velocity of the gas flow into the packed layer is very important from the standpoint of maintaining an appropriate gas-liquid counter current state as shown in FIG. 2. As a result of repeating various experiments, it has been found by the present inventors that with too low gas flow velocities the retention of a nitrogen gas cannot be resolved, and accordingly the gas is preferably flown at a superficial velocity of 0.02 $m^3/m^2 \cdot min$ (NTP) or higher, more preferably at a superficial velocity of 0.03 $m^3/m^2 \cdot min$ (NTP) or higher. On the other hand, with too high gas flow velocities the packing material within the packed layer is agitated with air bubbles, and unfavorably the biomembrane on the surface of the packing material is excessively peeled. From this viewpoint, the superficial velocity of the gas which passes through the packed layer is preferably 0.1 $m^3/m^2 \cdot min$ (NTP) or lower, more preferably 0.07 $m^3/m^2 \cdot min$ (NTP) or lower.

In another embodiment of the present invention, a gas having trace amounts of oxygen can be flown into the packed layer. As described above, flowing an oxygen-free gas into the packed layer is preferred to maintain an anaerobic state, but the residual hydrogen donor within the packed layer cannot be biologically oxidized, and is mixed into the treated water. On the other hand, too high oxygen gas concentrations in the gas flow are suited for the decomposition of the residual hydrogen donor, but it is difficult to maintain an anaerobic state within the packed layer and the essential nitrogen removal cannot be done. The oxygen concentration appropriate for maintaining an anaerobic state to effect nitrogen removal and, simultaneously, for effectively decomposing the hydrogen donor is determined by the amount of the hydrogen donor remaining and the superficial velocity of the gas flow.

When the concentration of the hydrogen donor remaining, the BOD equivalent weight of the hydrogen donor, the superficial velocity of the gas flow and the treatment velocity of the liquid to be treated are taken as M (mg/L), α, $V_g$ [m³/m²·min (NTP)], and $V_L$ [m³/m²·min (NTP)], respectively, the oxygen concentration C (%) necessary to decompose the residual hydrogen donor is shown by the following formula.

$$\alpha \times M \times V_L = (32,000/22.4) \times (C/100) \times V_g$$

$$\therefore C = 0.07 \times \alpha \times M \times V_L / V_g$$

A typical amount of the hydrogen donor remaining is normally controlled to 10 mg/L or less. Values above this are useless, and this value or less sometimes cannot follow the variation of the properties of the water to be treated (raw water). The most typical hydrogen donor is methanol and methanol has an α of 1.0.

Then, the superficial velocity of the gas flow is preferably 0.02 m³/m²·min (NTP) to 0.1 m3/m²·min (NTP) as described above. The treatment velocity of the liquid to be treated is typically 25 to 200 m/d and equivalent to 0.017 to 0.14 in m³/m²·min (NTP).

The range of the oxygen concentration C to be determined from the above comes to 0.1 to 4% by volume. Accordingly, in another embodiment of the present invention, it is preferred to allow a gas containing 0.1 to 4% by volume of oxygen to pass through the packed layer. As the method for obtaining a gas containing such trace amounts of oxygen, for example, the discharged gas passed through the packed layer is preferably mixed with an appropriate amount of air and then recycled.

The present invention will be explained more concretely by examples. The description below explains one embodiment to embody the technical thought of the present invention, and the present invention is not limited to the following description.

EXAMPLE 1

In this example is shown the effect of carrying out the biomembrane filtration treatment of water while flowing a substantially oxygen-free gas into a packed layer packed with a particulate packing material to which microorganisms are attached.

Figure 3:
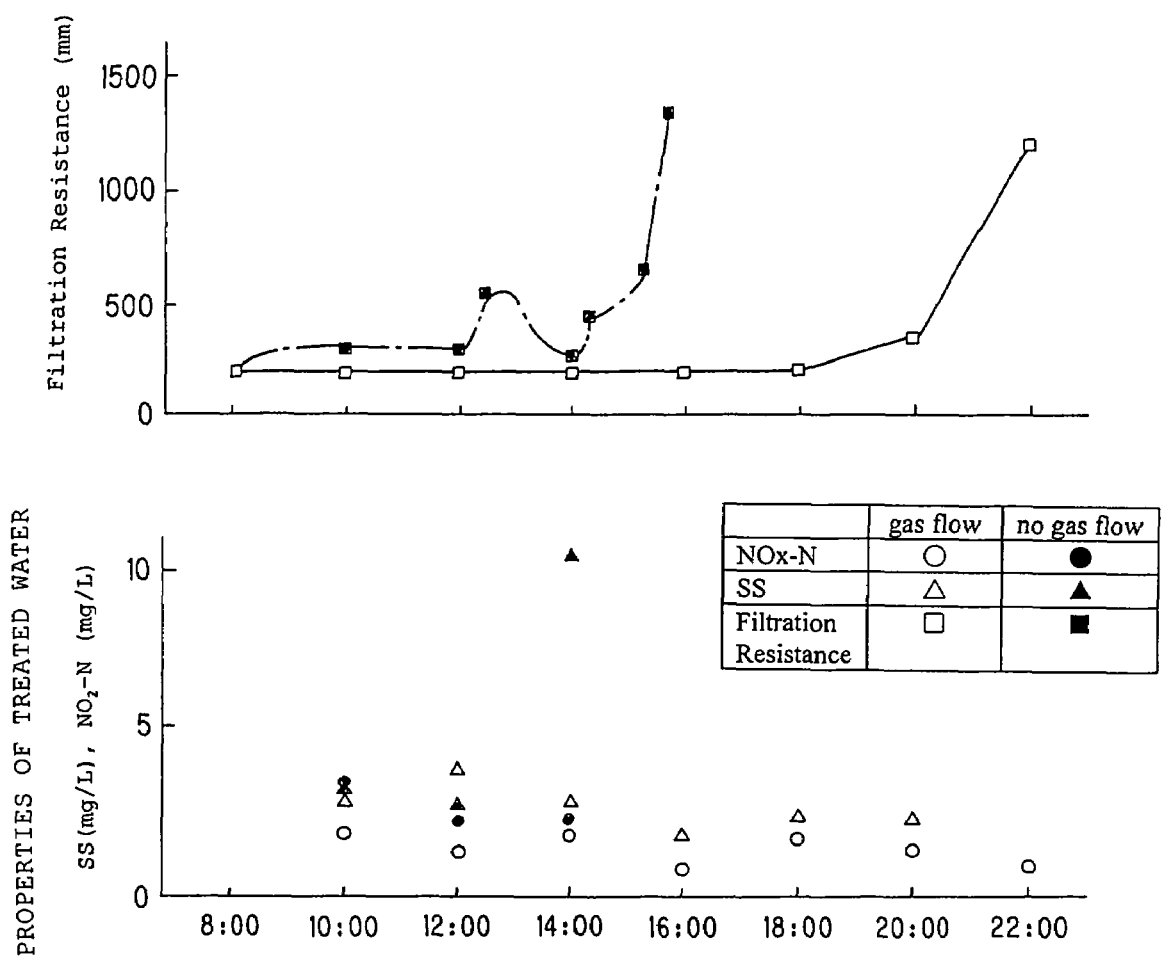
FIG. 3 is a graph showing change of properties of the treated water and the filtration resistance with the progression of time after back wash in one example of the present invention.

Anthracite having an effective diameter of 3 mm was packed as the packing material in a column having a diameter of 400 mm to a thickness of the packed layer of 2,000 mm. The treatment experiment was carried out by sprinkling a nitrified liquid obtained by subjecting the secondarily treated water of sewage to nitrification treatment by an aerobic biomembrane filtration apparatus as the raw water over the packed layer from above while flowing a gas from the bottom of the packed layer. The raw water had a water temperature of 21 to 24° C., a content of $NO_x$—N (nitrate nitrogen) of 18 to 21 mg/L, a content of SS (suspended solids) of about 2 m/L. The treatment velocity was set at 100 m/d and the superficial velocity of the gas flow was set at 0.04 m³/m²·min (NTP). The gas to be flown was a substantially oxygen-free gas having an oxygen content of 0.1% by volume or less. Further, as the reference data, the inside of the packed layer was rendered anaerobic without flowing any gas, and the experiment of the biomembrane filtration treatment of the raw water was carried out in the same manner. A methanol aqueous solution having a methanol concentration of 10% by weight was added in an amount of 60 mg/L to the raw water as the hydrogen donor for the anaerobic denitrification reaction. The results are shown in FIG. 3.

The treatment was started at 8:00 in the morning. When the biomembrane filtration treatment was carried out while flowing the substantially oxygen-free gas, the stabilized treatment as shown in FIG. 3 was carried out. On the other hand, when the gas was not flown, the filtration resistance temporarily rose at around 12:00,and thereafter was returned to the original filtration resistance at around 14:00.It might be considered from this result that a nitrogen gas was built up within the packed layer to temporarily raise the filtration resistance and then the gas ceased to build up for some cause whereby the filtration resistance was returned to the original value. Further, at around 14:00 the amount of SS of the treated water was abnormally increased. This supports the agitation of the packed layer as such by belching the nitrogen gas built up within the packed layer all at once. It has been found that the removal ratio of $NO_x$—N is generally higher when the gas is flown.

In the experiment in which the gas was not flown, the filtration resistance rapidly rose from around 15:00 and the back wash of the packing material was necessary, and accordingly the operation was stopped. On the other hand, in the experiment in which the gas was flown, the back wash was unnecessary till around 22:00,and thus the period of treatment time could be prolonged.

EXAMPLE 2

In this example, the influence of gas flow velocity on the treatment capacity was examined.

Figure 4:
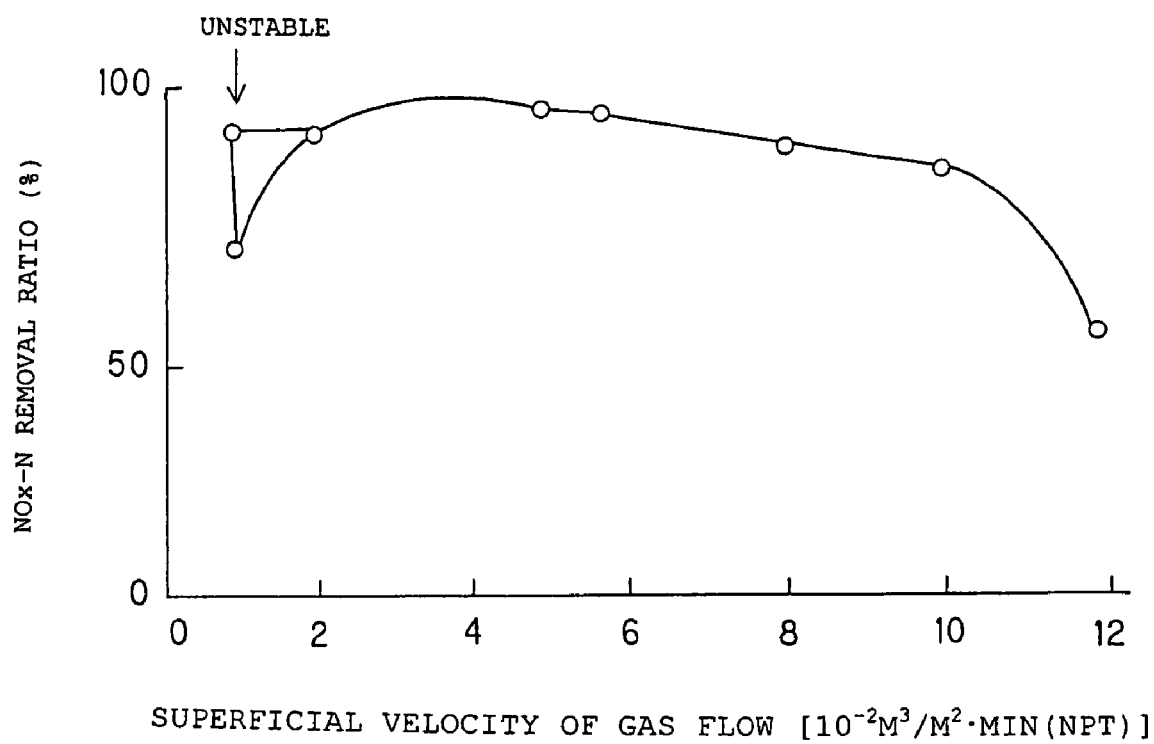
FIG. 4 is a graph showing the relationship between the superficial velocity of gas flow and the removal ratio of $NO_x$—N in one example of the present invention.

The experiment of the biomembrane filtration treatment of a raw water was carried out under the same conditions as in Example 1 except that the superficial velocity of the substantially oxygen-free gas in the packed layer was varied. FIG. 4 shows the relationship between the superficial velocity of the gas flow and the removal ratio of $NO_x$—N.

From FIG. 4, it was observed that with superficial velocities of the gas flow of less than 0.02 m³/m²·min, the removal ratio of $NO_x$—N was unstable and with superficial velocities of higher than 0.1 m³/m²·min the removal ratio tended to remarkably decrease. In the range of the superficial velocity of 0.03 to 0.07 m³/m²·min, 90% or more of the removal ratio of $NO_x$—N was obtained.

EXAMPLE 3

In this Example, the experiment of the biomembrane filtration treatment of a raw water was carried out by flowing a gas containing trace amounts of oxygen into the packed layer.

Anthracite having an effective diameter of 3 mm was packed as the packing material in a column having a diameter of 400 mm to a thickness of the packed layer of 2,000 mm. The treatment experiment according to the present invention was carried out by sprinkling a nitrified liquid obtained by subjecting the secondarily treated water of sewage to nitrification treatment by an aerobic biomembrane filtration apparatus as the raw water over the packed layer from above while flowing the gas from the bottom of the packed layer. The raw water had a water temperature of 21 to 23° C., a pH of 6.7 to 6.8,a content of $NO_x$—N (nitrate nitrogen) of 18 to 23 mg/L, a content of SS (suspended solids) of about 2 mg/L. The treatment velocity was set at 100 m/d and the superficial velocity of the gas flow was set at 0.04 m³/m²·min (NTP). The gas to be flown was a nitrogen gas containing trace amounts of oxygen whose oxygen content was 0.5% by volume (gas containing trace amounts of oxygen). Further, as the reference data, a substantially oxygen-free nitrogen gas having an oxygen concentration of 0.1% by volume or less (oxygen-free gas) was flown to effect experiment. A methanol aqueous solution having a methanol concentration of 10% by weight was added in an amount of 60 mg/L to the raw water as the hydrogen donor for the anaerobic denitrification reaction. The results are shown in Table 1.

TABLE 1

|  | Gas Containing Trace Amounts of Oxygen | Oxygen-Free Gas |
|---|---|---|
| Treatment Conditions |  |  |
| Filtration Velocity (m/d) | 100 | 100 |
| Superficial Velocity of Gas Flow [$m^3/m^2 \cdot$ min (NTP)] | 0.04 | 0.04 |
| Oxygen Concentration in Gas (%) | 0.5 | <0.1 |
| Water Properties of Treated Water |  |  |
| SS (g/L) | 1-3 | 1-3 |
| BOD (mg/L) | ≦2 | 5-12 |
| $NO_x$-N (mg/L) | 1-3 | 1-3 |
| $NO_x$-N Removal Ratio (%) | 86-96 | 87-96 |

When the gas containing trace amounts of oxygen was flown into the packed layer, the amount of BOD in the treated water was 2 mg/L while the substantially oxygen-free gas was flown into the packed layer, the amount of BOD remaining in the treated water was 5 to 12 mg/L and it was found necessary to subject the treated water to the treatment of removing the BOD as the post-treatment. As to the removal of SS and $NO_x$—N, good results nearly equal in either case were obtained.

INDUSTRIAL APPLICABILITY

According to the present invention, in the fix bed biomembrane filtration apparatus by sprinkling water to be treated (raw water) over a packed layer from above while flowing a substantially oxygen-free gas from the bottom of the packed layer to effect the biomembrane filtration treatment, the build-up of a nitrogen gas within the packed layer is resolved and, simultaneously, an appropriate gas-liquid counter current effect can be obtained, while denitrification of the raw water is conducted. Thus, the thickness of the biomembrane on the surface of the packing material can be rendered uniform, and the following effects can be obtained.
(1) The entire region in the packed layer can be always utilized, and thus the treatment capacity is high.
(2) The thickness of the biomembrane attaching to the surface of the packing material can be made uniform, and thus each particle of the packing material can be effectively utilized and the stability of the treatment is high.
(3) The frequency of back wash can be reduced, and thus the treatment is efficient.

Furthermore, in a preferred embodiment of the present invention, by flowing a gas containing trace amounts of oxygen into the packed layer, the build-up of a gas in the packed layer is resolved and, simultaneously, an appropriate gas-liquid counter current effect can be obtained, and thus the thickness of the biomembrane on the surface of the packing material can be made uniform and, simultaneously, the hydrogen donor remaining in the packed layer can also be removed, and thus a very effective treatment is possible.

The invention claimed is:
1. A method for treating raw water containing nitrate nitrogen and/or nitrite nitrogen, comprising:
   adding a hydrogen donor to the raw water, and
   passing the raw water containing the hydrogen donor as a downward flow through a packed layer comprising a particulate packing material to which microorganisms are attached; and
   while passing the water, passing a gas containing 0.1 to 4% of oxygen as an upward flow through the packed layer from the bottom of the packed layer.
2. The method of claim 1, wherein a gas discharged from the packed layer is recycled as the gas to be fed from the bottom of the packed layer.
3. The method according to claim 1, wherein the gas is passed through the packed layer at a superficial velocity of 0.02 to 0.1 $m^3/m^2 \cdot$min. (NTP).
4. The method of claim 1, wherein the hydrogen donor is methanol.
5. The method of claim 1, which is carried out by an apparatus comprising:
   a packed layer containing a particulate material to which microorganisms may attach;
   an inlet for liquid to be treated arranged above the packed layer to feed liquid to the packed layer; and
   a gas feed opening arranged under the packed layer to feed a substantially oxygen-free gas or a gas containing trace amounts of oxygen gas to the packed layer.
6. The method of claim 1, wherein said raw water is waste water.
7. The method of claim 1, wherein said raw water is sewage.
8. The method of claim 1, wherein said raw water is polluted river water.
9. The method of claim 1, wherein said raw water is lake or marshland water.
10. The method of claim 1, wherein said raw water is underground water.
11. The method of claim 1, wherein said particulate packing material comprises sand.
12. The method of claim 1, wherein said particulate packing material comprises anthracite.
13. The method of claim 1, wherein said particulate packing material comprises active carbon.
14. The method of claim 1, wherein said particulate packing material comprises a plastic filter medium.

\* \* \* \* \*